United States Patent
Teig (10) Patent No.: US 10,586,151 B1
(45) Date of Patent: Mar. 10, 2020

(54) MITIGATING OVERFITTING IN TRAINING MACHINE TRAINED NETWORKS

(71) Applicant: Perceive Corporation, San Jose, CA (US)

(72) Inventor: Steven L. Teig, Menlo Park, CA (US)

(73) Assignee: Perceive Corporation, San Jose, CA (US)

( * ) Notice: Subject to any disclaimer, the term of this patent is extended or adjusted under 35 U.S.C. 154(b) by 730 days.

(21) Appl. No.: 15/224,632

(22) Filed: Jul. 31, 2016

Related U.S. Application Data (60) Provisional application No. 62/199,560, filed on Jul. 31, 2015.

(51) Int. Cl.
  *G06N 3/08* (2006.01)
(52) U.S. Cl.
  CPC ...................................... *G06N 3/08* (2013.01)
(58) Field of Classification Search
  None
  See application file for complete search history.

(56) References Cited

U.S. PATENT DOCUMENTS

| | | | |
|---|---|---|---|
| 2015/0161995 A1* | 6/2015 | Sainath | G10L 15/16 704/232 |
| 2017/0161640 A1 | 6/2017 | Shamir | |

OTHER PUBLICATIONS

Nitish Srivastava, Geoffrey Hinton, Alex Krizhevsky, Ilya Sutskever, and Ruslan Salakhutdinov. 2014. Dropout: a simple way to prevent neural networks from overfitting. J. Mach. Learn. Res. 15, 1 (Jan. 2014), 1929-1958.*

Kingma DP, Salimans T, Welling M. Variational Dropout and the Local Reparameterization Trick. Jun. 8, 2015 (v1).*

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

(Continued)

*Primary Examiner* — Kakali Chaki
*Assistant Examiner* — Charles C Kuo
(74) *Attorney, Agent, or Firm* — Adeli LLP (57) ABSTRACT

Some embodiments of the invention provide a novel method for training a multi-layer node network that mitigates against overfitting the adjustable parameters of the network for a particular problem. During training, the method of some embodiments adjusts the modifiable parameters of the network by iteratively identifying different interior-node, influence-attenuating masks that effectively specify different sampled networks of the multi-layer node network. An interior-node, influence-attenuating mask specifies attenuation parameters that are applied (1) to the outputs of the interior nodes of the network in some embodiments, (2) to the inputs of the interior nodes of the network in other embodiments, or (3) to the outputs and inputs of the interior nodes in still other embodiments. In each mask, the attenuation parameters can be any one of several values (e.g., three or more values) within a range of values (e.g., between 0 and 1).

21 Claims, 8 Drawing Sheets

(56) References Cited

OTHER PUBLICATIONS

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Jain, Anil K., et al., "Artificial Neural Networks: A Tutorial," Computer, Mar. 1996, 14 pages, vol. 29, Issue 3, IEEE.

Kingma, Diederik P., et al., "Auto-Encoding Variational Bayes," May 1, 2014, 14 pages, arXiv:1312.6114v10, Computing Research Repository (CoRR)—Cornell University, Ithaca, NY, USA.

Kingma, Diederik P., et al., "Variational Dropout and the Local Reparameterization Trick," Proceedings of the 28th International Conference on Neural Information Processing Systems (NIPS '15), Dec. 7-12, 2015, 14 pages, MIT Press, Montreal, Canada.

Louizos, Christos, et al., "Bayesian Compression for Deep Learning," Proceedings of Advances in Neural nformation Processing Systems 30 (NIPS 2017), Dec. 4-9, 2017, 17 pages, Neural Information Processing Systems Foundation, Inc., Long Beach, CA, USA.

Molchanov, Dmitry, et al., "Variational Dropout Sparsifies Deep Neural Networks," Feb. 27, 2017, 10 pages, arXiv:1701.05369v2, Computing Research Repository (CoRR)—Cornell University, Ithaca, NY, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Li, Hong-Xing, et al., "Interpolation Functions of Feedforward Neural Networks," Computers & Mathematics with Applications, Dec. 2003, 14 pages, vol. 46, Issue 12, Elsevier Ltd.

* cited by examiner

MITIGATING OVERFITTING IN TRAINING MACHINE TRAINED NETWORKS

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feedforward, convolutional, recurrent, long-short term memory (LSTM), and Neural Turing Machines (NTM). As is also the case for most other types of models, DNNs are sufficiently expressive in that they can easily overfit data, i.e., model some of the uninformative noise in the input data in addition to the informative signal.

One recent technique for mitigating overfitting in neural networks is a method known in industry as "Dropout." Two papers that describe Dropout are Nitish Srivastava, Geoffrey Hinton, Alex Krizhevsky, Ilya Sutskever, Ruslan Salakhutdinov, "Dropout: A Simple Way to Prevent Neural Networks from Overfitting," Journal of Machine Learning Research 15 (2014) 1929-1958; and Geoffrey E Hinton et al., "System and Method for Addressing Overfitting in a Neural Network," Patent Cooperation Treaty Publication WO2014105866 A1, Jul. 3, 2014.

To understand Dropout, one should first review the structure of a neuron within a typical neural network. A neural network includes a graph, or hypergraph of neurons, $N_i$. This graph includes a set of input-stage neurons (input neurons), a set of output-stage neurons (output neurons), and a set of intermediate neurons between the input and output stage neurons. The intermediate neurons are typically referred as hidden neurons, as they are interior neurons shielded from the input and output periphery of the neural network. A collection of inputs and a function, $f_i$, are associated with each neuron. Typically, each $f_i$ is a non-linear function of the dot product of a set of weights, $W_{i,j}$ with the values, $V_{i,j}$, of the inputs. For example, a sigmoid function (such as tanh) can be used for each of the non-linear functions $f_i$, leading to $f_i = \tanh(\Sigma_{i,j}(W_{i,j} * V_{i,j}))$.

Supervised training of a neural network determines each weight coefficient $W_{i,j}$, usually by providing a series of pairs, $(X_k, Y_k)$, to the neural network. One of the $x \in X_k$ is supplied to the primary inputs, and the corresponding $y \in Y_k$ is used at the primary outputs. Initially, a disparity between the actual y value and the value generated by the network will likely exist. This disparity between y and the value produced by the network being trained is used to drive techniques, such as backpropagation, stochastic gradient descent, and the like, to update the weight coefficients $W_{i,j}$.

Dropout is a modification of the training procedure in which a newly selected, random fraction a of the hidden neurons are eliminated from the neural network (i.e., a fraction of the interior neuron output values $V_{i,j}$ are temporarily set to 0) each time a training datum is presented to the network to update the weight coefficients $W_{i,j}$. Typically, $\alpha$ is 0.5 in practice. Since any value multiplied by zero is always zero and the magnitude of any weight $W_{i,j}$ that is to be multiplied by a zeroed value is irrelevant, the dot product is scaled up during Dropout training to compensate. For example, suppose that the sum of the weights for neuron q is $$W_q = \Sigma_{inputs\ j\ of\ q}(W_{q,j}),$$

and for the current training datum, the sum of the weights for the zeroed values among neuron q's inputs is $Z_q$. Then, temporarily multiplying the dot product $\Sigma_j(W_q * V_{q,j})$ by $(W_q/(W_q - Z_q))$ in the computation of $f_q$ compensates for the zeroing of some of the values by effectively treating the zeroed values as preserving the average behavior of the values that were not zeroed.

Existing Dropout techniques aim to avoid overfitting, e.g., by performing a type of bagging. See Leo Brieman, "Bagging Predictors," *Machine Learning* 24 (2): 123-140, 1996. That is, Dropout can be seen as averaging $2^n$ different neural networks, or sub-networks, where the exponent "n" is the number of weights in the network being trained, with every sub-network including a subset of the weights. Essentially, the Dropout scheme incorporates as many models as in the powerset of the number of weights in the original network; hence, $2^n$ models are incorporated. The averaging a collection of weak models of produces a stronger model than any single member of the collection and the quality of prediction increases with the number of models contributing to the collective decision.

SUMMARY

Some embodiments of the invention provide a novel method for training a multi-layer node network that mitigates against overfitting the adjustable parameters of the network for a particular problem. The multi-layer network in some embodiments includes an input node set, an output node set and one or more layers of interior node sets between the input and output node sets. In some embodiments, each node has (1) a linear component that uses a set of weight coefficients to combine a set of output values of a set of other nodes to produce a first calculated value, and (2) a nonlinear component that uses a nonlinear function to compute a second calculated value from the node's first calculated value. The second calculated value of a node is the node's output value in some embodiments.

During training, the method of some embodiments adjusts the modifiable parameters of the network (e.g., the weight coefficients of the interior node inputs) by iteratively identifying different interior-node, influence-attenuating masks that effectively specify a probability distribution over numerous, distinct variations of the multi-layer node network. These variations are referred to below as sampled networks. For a sampled network specified by an influence attenuating mask, the method of some embodiments selects an input/output values set from a training set of input/output values. The method then (1) forward propagates the input value set through the sampled network to compute a set of output values, (2) identifies a set of error values that express the difference between the computed output value set and the selected output value set (associated with the selected input value set), and (3) back propagates the error value set to adjust the modifiable parameters of the sampled network (e.g., the weight coefficients of the interior node inputs). The method in some embodiments computes the modifiable parameters of the network by averaging the values (e.g., computing geometric mean or arithmetic mean of the values) of these parameters over all of the sampled networks that it explores. In iterating through the different interior-node, influence-attenuating masks, the method of some embodiments can select the same mask multiple times sequentially or non-sequentially.

An interior-node, influence-attenuating mask specifies attenuation parameters that are applied (1) to the outputs of the interior nodes of the network in some embodiments, (2) to the inputs of the interior nodes of the network in other embodiments, or (3) to the outputs and inputs of the interior nodes in still other embodiments. In each mask, the attenuation parameters can be any one of several values (e.g., three or more values) within a range of values (e.g., between 0 and 1). During the forward and backward propagation operations that the method performs for a sampled network that it identifies based on a particular influence-attenuating mask, the method of some embodiments multiplies the values received at node inputs (from the outputs of the prior nodes) and/or generated at that node outputs (from the nonlinear components of the nodes) with the attenuation parameters that the mask specifies for those inputs and/or outputs.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method for training a multi-layer node network that mitigates against overfitting the adjustable parameters of the network for a particular problem. The multi-layer network in some embodiments includes an input node set, an output node set and one or more layers of interior node sets between the input and output node sets. In some embodiments, each node has (1) a linear component that uses a set of weight coefficients to combine a set of output values of a set of other nodes to produce a first calculated value, and (2) a nonlinear component that uses a nonlinear function to compute a second calculated value from the node's first calculated value. The second calculated value of a node is the node's output value in some embodiments.

During training, the method of some embodiments adjusts the modifiable parameters of the network (e.g., the weight coefficients of the interior node inputs) by iteratively identifying different interior-node, influence-attenuating masks that effectively specify different sampled networks from a probability distribution of sampled networks that are derivable from the multi-layer node network. For a sampled network specified by an influence attenuating mask, the method of some embodiments selects an input/output values set from a training set of input/output values. The method then (1) forward propagates the input value set through the sampled network to compute a set of output values, (2) identifies a set of error values that express the difference between the computed output value set and the selected output value set associated with the selected input value set, and (3) back propagates the error value set to adjust the modifiable parameters of the sampled network (e.g., the weight coefficients of the interior node inputs). The method in some embodiments computes the modifiable parameters of the network by averaging the values (e.g., computing geometric mean or arithmetic mean of the values) of these parameters over all of the sampled networks that it explores. In iterating through the different interior-node, influence-attenuating masks, the method of some embodiments can select the same mask multiple times sequentially or non-sequentially.

An interior-node, influence-attenuating mask specifies attenuation parameters that are applied (1) to the outputs of the interior nodes of the network in some embodiments, (2) to the inputs of the interior nodes of the network in other embodiments, or (3) to the outputs and inputs of the interior nodes in still other embodiments. In each mask, the attenuation parameters can be any one of several values (e.g., three or more values) within a range of values (e.g., between 0 and 1). During the forward and backward propagation operations that the method performs for a sampled network that is specified by the application of a particular influence-attenuating mask, the method of some embodiments multiplies the values received at node inputs (from the outputs of the prior nodes) and/or generated at that node outputs (from the nonlinear components of the nodes) with the attenuation parameters that the mask specifies for those inputs and/or outputs.

The expression "sampled network" is used to refer to the explored variations of the network for the following reason. Given a single network A, imagine constructing a large space S(A) of networks that have the same connectivity and number of nodes as A but apply an attenuation parameter to each edge or output in A by some value in the interval between 0 and 1. If 0 means "fully attenuated" and 1 means "not attenuated at all", then seeing all of the attenuation values to 1 returns A itself, which is a member of S(A). By randomly assigning an attenuation value between 0 and 1 to each edge or each output of the network, Dripout selects a random network from the joint uniform probability distribution on S(A), where each edge's or output's attenuation is uniformly distributed on the unit interval. The expression sampled network refers to one of the random networks selected by Dripout as described above.

The Dripout method for training a multi-layer node network mitigates against overfitting the adjustable parameters of the network for a particular problem. This technique is referred to as Dripout below. This new method of training the multi-layer node networks (e.g., neural networks) provides an average of a much larger collection of sampled networks than the sub-networks used by the Dropout techniques. The Dripout method of some embodiments generalizes the scheme of having each sample contribute either 0 votes or 1 vote to the collective decision, by using influence-attenuating masks that have attenuation parameters anywhere between 0 and 1.

The more general averaging scheme of Dripout is exponentially more powerful than Dropout, incorporating, asymptotically, the powerset of the powerset of the original weights or interior nodes to explore $2^{2^n}$ sampled networks, as compared to the $2^n$ sub-networks explored in Dropout, where the exponent "n" is the number of weights or the number of interior nodes in the network. In the embodiments that exclude zero as an attenuation parameter, the Dripout method avoids Dropout's flaw of ignoring an interior node input or output, which might be necessary for accurately modeling a particular datum. Ignoring such interior node input or output needlessly worsens the quality of the composite model generated by Dropout method. In particular, if a dataset contains entries that provide unique, irredundant information, Dropout fails to communicate that irredundant information to half of the interior node inputs or outputs (in the typical case that Dropout probability is 0.5).

Figure 1:
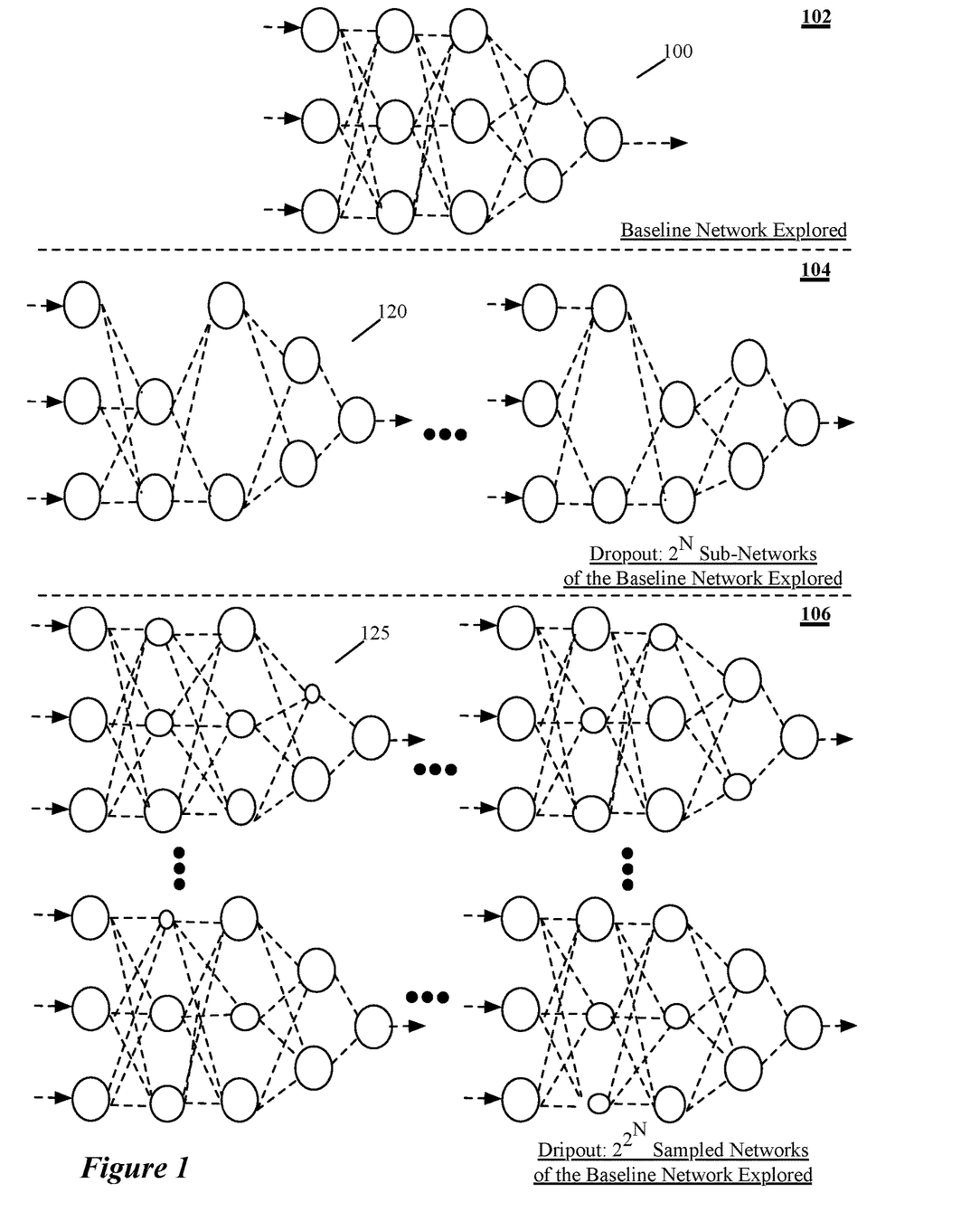
FIG. 1 presents an example that illustrate the difference between the Dripout and Dropout methods when these methods are used to reduce or eliminate the influence of interior node outputs in a multi-layer node network.

FIG. 1 presents an example that illustrate the difference between the Dripout and Dropout methods when these methods are used to reduce or eliminate the influence of interior node outputs in a multi-layer node network. This figure is divided in three sections 102, 104, and 106. The first section 102 illustrates a multi-layer, machine trained (MT) node network 100. The network 100 is a feed forward network that has multiple layers of processing nodes, which include one layer of input processing nodes, several layers of interior processing nodes, and one layer of output processing nodes. In the network 100, each interior processing node receives two or more outputs of processing nodes from earlier processing node layers and provides its output to one or more processing nodes in subsequent layers. As further described below, section 104 of FIG. 1 illustrates Dropout by randomly excluding edges from network 100, while section 106 uses the varying diameters of the nodes to capture graphically the Dripout idea of probabilistically incorporating a node's value by multiplying it by a randomly selected weight.

Figure 2:
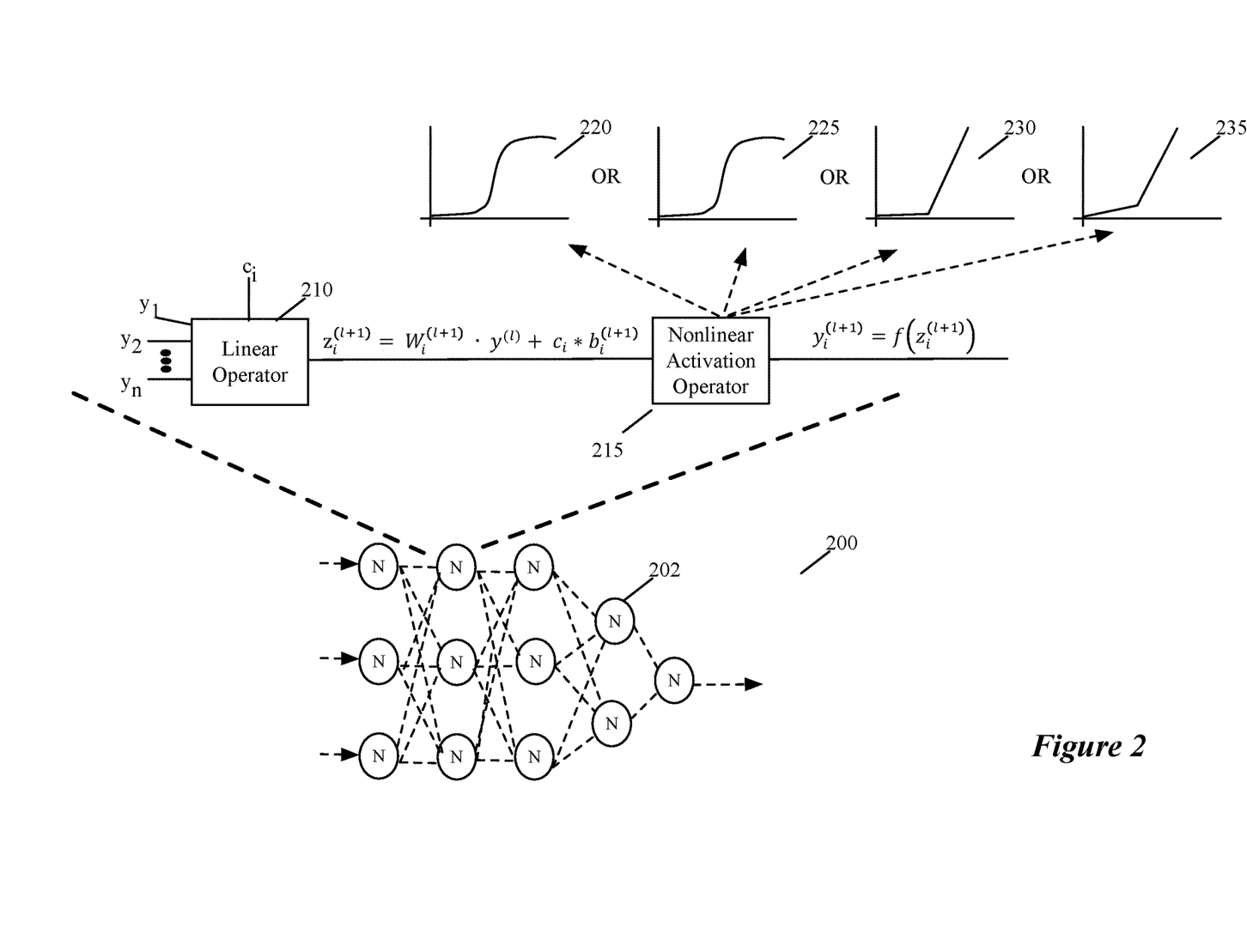
FIG. 2 illustrates an example of the machine-trained network of some embodiments.

FIG. 2 illustrates an example of the MT network 100 of some embodiments. This figure illustrates a feedforward neural network 200 that has multiple layers of processing nodes, called neurons 202. In all but the last layer, each neuron 202 receives two or more outputs of neurons from earlier processing node layers and provides its output to one or more neurons in subsequent layers. The output of the neuron in the last layer represents the output of the network 200. In some embodiments, the output of the network 200 is a number in a range of values (e.g., 0 to 1). In this example, the neural network 200 only has one output node. The neural network of other embodiments has several output nodes that provide more than one output value. Also, the neural network of other embodiments is not a feed forward network (e.g., is a recurrent network, etc.).

As shown in FIG. 2, each neuron in neural network 200 has a linear component 210 and a nonlinear component 215. The linear component 210 of each interior or output neuron in this example computes a dot product of a vector of weight coefficients and a vector of output values of prior nodes, plus an offset. In other words, an interior or output node's linear operator computes a weighted sum of its inputs (which are outputs of the previous stage neurons that the linear operator receives) plus an offset. Similarly, the linear component 210 of each input neuron computes a dot product of a vector of weight coefficients and a vector of input values, plus an offset. Each neuron's nonlinear component 215 computes a function based on the output of the neuron's linear component 210. This function is commonly referred to as the activation function.

The notation of FIG. 2 can be described as follows. Consider a neural network with L hidden layers (i.e., L layers that are not the input layer or the output layer). The variable l can be any of the L hidden layers (i.e., $l \in \{1, \ldots, L\}$ index the hidden layers of the network). The variable $z_i^{(l+1)}$ represents the output of the linear component of an interior neuron i in layer l+1. As indicated by the following Equation (A), the variable $z_i^{(l+1)}$ is computed as the dot product of a vector of weight values $W^{(l)}$ and a vector of outputs $y^{(l)}$ from layer l plus an offset that is computed as a constant value $c_i$ times a weight value $b_i$, typically referred to as a bias.

$$z_i^{(l+1)} = w_i^{(l+1)} \cdot y^{(l)} = c_i * b_i^{(l+1)}. \tag{A}$$

The constant value $c_i$ is a value to which all the weight values are normalized. In some embodiment, the constant value $c_i$ is 1. The symbol * is an element-wise product, while the symbol • is the dot product. The weight coefficients $W^{(l)}$ are parameters that can be adjusted during the network's training in order to configure this network to solve a particular problem.

The output $y_i^{(l+1)}$ of the nonlinear component 215 of a neuron in layer l+1 is a function of the neuron's linear component, and can be expressed as by Equation (B) below.

$$y_i^{(l+1)} = f(z_i^{(l+1)}), \tag{B}$$

In this equation, f is the nonlinear activation function for node i. Examples of such activation functions include a sigmoid function 220 ($f(x)=1/(1+e^{-x})$), a tanh function 225, a ReLU (rectified linear unit) function 230 or a leaky ReLU function 235, as shown.

Traditionally, the sigmoid function and the tanh function have been the activation functions of choice. More recently, the ReLU function has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (B) can be expressed in the following expanded format of Equation (C).

$$y_i^{(l+1)} = f(z_i^{(l+1)}) = f\left[\left(\sum_{k=1}^{n} w_{ki} * y_k\right) + c_i * b_i^{(l+1)}\right],\quad (C)$$

In this equation, $w_{ki}$ are weight values associated with the inputs $y_k$ of the neuron i in layer l+1.

Before the network 100 can be used to solve a particular problem, the network has to be put through a supervised training process that adjusts the network's configurable parameters (e.g., the weight coefficients of its linear components). The training process iteratively selects different input value sets with known output value sets. For each selected input value set, the training process traditionally (1) forward propagates the input value set through the network's nodes to produce a computed output value set, and then (2) back propagates an output error value set that quantifies the difference between the input set's known output value set and the input set's computed output value set in order to adjust the network's configurable parameters.

The second section 104 illustrates the Dropout method for training the network 100. As shown, the Dropout method generates different sub-networks 120 from the network 100. To generate a sub-network, the Dropout method selects an output node attenuation mask. Each mask eliminates (i.e., zeroes out) a random fraction (e.g., 0.5) of the interior node outputs of the network 100, and hence effectively specifies a different sub-network 120 for training.

For a sub-network, the Dropout method selects an input/output value set from the training set. For the selected input/output value set, the method performs forward and backward propagation operations to adjust the weight coefficients of the linear components of the interior nodes. To perform the forward and backward propagation operations for a sub-network, the Dropout method scales up the weight coefficients that are not zeroed out for the sub-network in order to account for the elimination of some of the output values (e.g., in order to ensure that the combined adjusted weight values sum up to 1). The Dropout method then averages the weight coefficients of the linear operators of the nodes to define the weight coefficients of the network 100.

By using different masks for different rounds of training, the Dropout method aims to avoid overfitting, by exploring $2^n$ different sub-networks of the network 100, where the exponent "n" is the number of weight coefficients being trained. The second section 104 illustrates several examples of the $2^n$ different sub-networks that are produced from the baseline network 100 by eliminating different set of interior nodes for different input/output value sets. By averaging a collection of results over several explored sub-networks, the Dropout method seeks to produce a stronger model than any single member of the collection and the quality of prediction increases with the number of models contributing to the collective decision.

The third section 106 illustrates the Dripout method of some embodiment for training the network 100 to configure the adjustable parameters of the network 100 (e.g., the weight values of its linear operators). During this training, the method of some embodiments adjusts the weight coefficients of the interior node inputs by iteratively identifying different interior-node, influence-attenuating masks that effectively specify different sampled networks 125 from a probability distribution of different variations to the multi-layer node network. In this example, each interior-node, influence-attenuating mask specifies attenuation parameters that are applied to the outputs of the interior nodes of the network. During the forward and backward propagation operations that the method performs for a sampled network that it identifies based on a particular influence-attenuating mask, the method of some embodiments multiplies the values generated at the outputs of the sampled network interior nodes with the attenuation parameters that the mask specifies for those outputs.

In some embodiments, the attenuation parameters of the mask can be any value between 0 and 1, including 0 and 1, while in other embodiments they can be any value within this range except for 0. In some embodiments, the attenuation parameters of the mask are uniformly random across the entire 0 to 1 interval quantized to some resolution for representation on a digital computer, while in other embodiments, the attenuation parameters can be non-uniformly defined in one or more range(s) of values between 0 and 1.

One of ordinary skill in the art will recognize the Dripout procedure as a form of Rao-Blackwell process over the available sampled networks. In randomly assigning weights 0 or 1 to edges or outputs in a MT network, Dropout constructs samples from a uniform probability distribution of alternative network weightings for a given MT network's structure. The Dropout procedures average over these samples to estimate the weightings for the "mean" network over the distribution. The only samples that Dropout, etc. permit are those where each network weight is selected with probability 1 or probability 0. Since mean is a sufficient statistic, though, a more accurate estimate per unit effort of that mean—often dramatically so—would result from the use of a more statistically efficient sampling procedure than Dropout, etc. The Rao-Blackwell theorem provides the mathematical requirements for the most efficient possible such procedure, and Dripout satisfies those requirements. Dripout selects weights from the conditional expected value of each weight in creating each sampled network, which satisfies the requirements of the Rao-Blackwell theorem and results in the minimum expected loss (e.g., minimum mean squared error) in estimating the mean weight values.

The third section 106 of FIG. 1 pictorially illustrates the reduction of influence of the subset of the interior nodes by showing these nodes with different diameters. For instance, an interior node that has its output reduced by 80% (i.e., that has an influence-attenuating mask value of 0.2) is shown to have an 80% smaller diameter in the third section 106 than in the first section 102, while an interior node that has its output reduced by 50% (i.e., that has an influence-attenuating mask value of 0.5) is shown to have a diameter 50% smaller in the third section 106 than in the first section 102.

For a sampled network 125 specified by an influence attenuating mask, the Dripout method of some embodiments selects an input/output values set from a training set of input/output values. The method then (1) forward propagates the input value set through the sampled network to compute a set of output values, (2) identifies a set of error values that express the difference between the selected output value set (associated with the selected input value set) and the computed output value set, and (3) back propagates the error value set to adjust the weight coefficients of the interior node inputs. To perform the forward and backward propagation operations for a sampled network, the Dripout method scales up the weight coefficients for the sampled network in order to account for the reduction of influence of some of the output values, as further described below. The method in some embodiments computes the weight coefficients of the linear operators of the network 100 by averaging the values (e.g., by computing a geometric average or an arithmetic average of the values) of these coefficients over all of the sampled networks that it explores. In iterating through the different interior-node, influence-attenuating masks, the Dripout method of some embodiments can select the same mask multiple times sequentially or non-sequentially.

Contrary to the Dropout strategy of ignoring some of the interior node outputs (i.e., typically, 50%) from any given training decision, the Dripout method of some embodiments ensures that all the interior node outputs contribute somewhat to each training decision when the attenuation parameters include any values between 0 and 1, except for 0. Because the Dripout method of some embodiments samples the conditional expectation over the possible sub-networks given the mean, the Rao-Blackwell theorem ensures that the resulting network is at least as accurate as Dropout and usually far more accurate. In effect, by sampling networks from the powerset of the set of sampled networks, the Dripout method explores a much larger range of sampled networks of the network 100. While the Dropout method explores $2^n$ different sub-networks of the network 100, the Dripout method explore $2^{2^n}$ sampled networks, where the exponent "n" is the number of weight coefficients in the network 100 being trained.

The third section 106 illustrates several examples of the $2^{2^n}$ sampled networks that are produced from the baseline network 100 by reducing the outputs of different set of interior nodes during different training iterations. To pictorially convey the larger range of explored sampled networks, the third section 106 depicts a larger number of sampled networks explored by the Dripout method than the second section 104 depicts sub-networks for the Dropout method. By averaging over a much larger collection of sampled networks, the Dripout method produces a much stronger model than that produced by the Dropout method. As is known to one skilled in the art, the Rao-Blackwell process results in an estimator that is, in various senses, optimal.

The Dripout method can be applied to the interior node inputs instead of the interior node outputs. Specifically, in some embodiments, the Dripout method applies the attenuation parameters to the input values of the interior nodes, or to the weight values associated with these interior nodes. To obtain each explored sample network, the Dripout method of some embodiments multiplies each input value, or each weight coefficient, of each interior node by an attenuation parameter between 0 and 1 that is specified for the input in an influence-attenuating mask that is used to identify the sampled network. In some embodiments, the attenuation parameters specified in the mask are uniformly random across the entire interval, quantized to some resolution for representation on a digital computer, while in other embodiments, these attenuation parameters can fall non-uniformly within one or more ranges of values between 0 and 1. For the Dripout method of some embodiments, the attenuation parameters can be any value between 0 and 1 in order to ensure that every weight contributes somewhat to each training decision, contrary to the Dropout strategy of ignoring some of the weights (i.e., typically, 50%) from any given training decision. Also, as in the case of applying Dripout to the interior node outputs, some embodiments do not allow the attenuation parameters that are applied to the interior node inputs to be 0.

Figure 3:
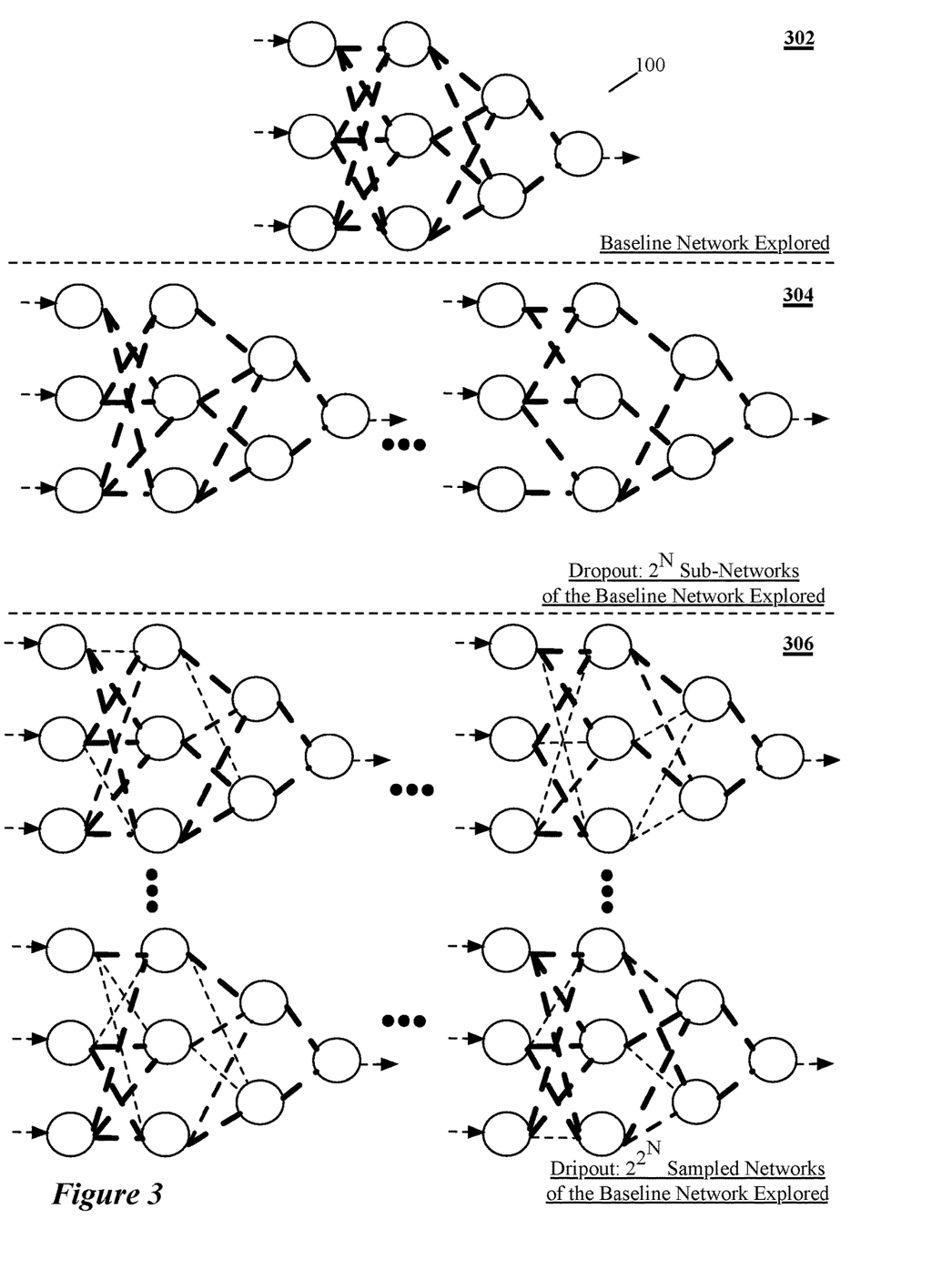
FIG. 3 illustrates examples of applying the Dropout and Dripout methods to the interior node inputs of the network.

FIG. 3 illustrates examples of applying the Dropout and Dripout methods to the interior node inputs of the network 100. These examples are analogous to those illustrated in FIG. 1, except that the second section 304 of FIG. 3 shows the Dropout method differentiating different sub-networks by eliminating inputs to the interior nodes, while the third section 306 of FIG. 3 shows the Dripout method differentiating different sampled networks by adjusting the magnitude of the interior node inputs.

The third section 306 depicts different adjustments to different interior node inputs by representing the different adjustments with different line widths. For instance, an interior node input that is reduced by 80% (i.e., that has an influence-attenuating mask value of 0.2) is shown to be 80% thinner in the third section 306 than in the first section 302, while an interior node input that is reduced by 50% (i.e., that has an influence-attenuating mask value of 0.5) is shown to be 50% thinner in the third section 306 than in the first section 302.

The Dripout method of FIG. 3 ensure that all the interior node inputs contribute somewhat to each training decision when the attenuation parameters include any values between 0 and 1, except for 0. Because this Dripout method does not eliminate any interior node inputs but rather reduces the influence of some inputs, this method explores a much larger range of sampled networks of the network 300. While the Dropout method of FIG. 3 explores $2^n$ different sub-networks of the network 100, the Dripout method of this figure explore $2^{2^n}$ sampled networks, where the exponent "n" is the number of interior node inputs in the network 100 being trained. This is pictorially illustrated in FIG. 3 by showing a larger number of sampled networks in the third region 306 than in the second region 304 shows for the sub-networks explored by Dropout. Even when the Dripout embodiments allow some of the attenuation parameters to be 0, these embodiments can still ensure that a majority of the interior node inputs contribute to each training decision by ensuring that a disproportionate number of the attenuation parameters are not assigned to 0.

When one or more inputs of an interior node are attenuated by mask values less than 1, the Dripout method of FIG. 3 renormalizes the weight values so that the combined effect of the inputs is unchanged while the relative influence of the inputs is adjusted by the mask value. By trying to maintain the "total" influence of the inputs relatively constant through the rescaling of the weight coefficients, the Dripout method of some embodiments tries to prevent the scale of the interior node outputs from fluctuating too much as an unintended consequence of adjusting the weight coefficients.

Assume that (1) a linear operator has 3 inputs, (2) the current weight values for these three inputs are (0.5, 0.25, and 0.25), which sum up to 1, and (2) the mask values for the three inputs are (0.5, 0.8, and 0.6). The mask values are applied to the weight values to produce a first adjusted set of weight values, 0.25, 0.2, and 0.15. To ensure that the total influence of the inputs remains relatively constant so that the scale of the output does not fluctuated too much as an intended consequence of modifying the effective weights, the weight values are adjusted again to ensure that their sum is 1. To do this rescaling, each adjusted weight value is multiplied by a multiplier, which in this example is 1.67, as derived by 1/(0.25+0.2+0.15). The result of these multiplication is a second set of adjusted weight values, 0.416, 0.334, 0.25, and the linear operator uses these adjusted weight values to compute its dot product, instead of using the first set of adjusted weight values, 0.25, 0.2, and 0.15.

Figure 4:
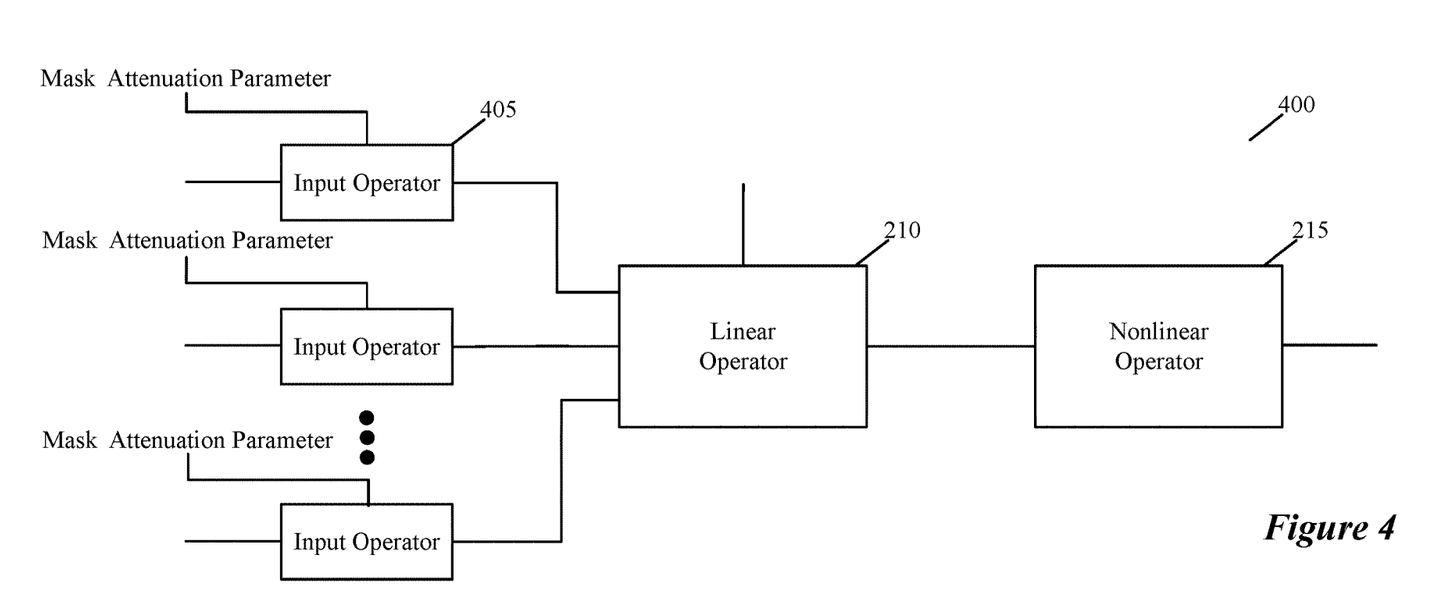
FIGS. 4 and 5 illustrate examples that show the structure of interior node neurons as modified during training by the Dripout methods of some embodiments of the invention.

A more detailed explanation of the rescaling of the weight coefficients will now be provided by reference to the example presented in FIG. 4. This example shows the structure of an interior node neuron (in layer l+1) as modified during training by the Dripout method of some embodiments of the invention. As shown, the Dripout method of some embodiments place an input operator 405 before the neuron's linear operator 210, which produces the input for the neuron's nonlinear operator 215. The input operator 405 for an input $y_k$ of the neuron multiplies that input $y_k$ (that the neuron receives from an earlier stage neuron) by an attenuation parameter that is specified for that input in the mask that the Dripout method uses to define one of the sampled networks from the network 100. When the attenuation parameter for an input is less than 1, the influence of that input is reduced in the training of the sampled network.

Given the structure of neuron i in FIG. 4, the output of the linear operator 210 of this neuron can be described as:

$$z_i^{(l+1)\prime}=w_i^{(l+1)\prime}\cdot y^{(l)}+c_i*b_i^{(l+1)},$$

where $w_i^{(l+1)\prime}$ is the first adjusted weight coefficients $w_i^{(l+1)}$ for the linear operator as expressed by:

$$w_k^{(l+1)\prime}=r_k^{(l+1)}*w_k^{(l+1)},$$

where k is the input of the neuron and $r_k$ is the attenuation parameter for the input k from the mask. The output of the nonlinear component 215 can be expressed as:

$$y_i^{(l+1)\prime}=f(z_i^{(l+1)\prime}),$$

However, instead of using the first set of adjusted weight coefficients $w_i^{(l+1)\prime}$ for the forward and backward propagation operations, the Dripout method uses a rescaled, second set of weight coefficients $w_i^{(l+1)\prime\prime}$ by rescaling the adjusted first set of weight coefficients $w_i^{(l+1)\prime}$ again to preserve the relative influences of these coefficients while modifying their absolute influences to sum to a constant. In some embodiment, the selected constant is 1 and the scaled weight coefficients are expressed by the following Equation (D):

$$w_k^{(l+1)\prime\prime}=M_k^{(l+1)}*w_k^{(l+1)\prime}, \quad (D)$$

where $M_k^{(l+1)}$ is a multiplier that is derived as follows:

$$M_k^{(l+1)} = \frac{1}{\Sigma_k w_k^{(l+1)\prime}}.$$

A similar rescaling expression can be specified for Dripout methods that apply the attenuation parameters to the outputs of the interior neurons instead of the inputs of these neurons, except for two differences that are explained by reference to FIG. 5. This figure provides an example that illustrates the application of the attenuation parameter at the output of a neuron in layer l. This example shows the structure of the interior node neuron 500 in layer l, as modified during training by the Dripout method of some embodiments of the invention.

As shown, the Dripout method of some embodiments places an output operator 505 after the neuron's nonlinear component to potentially adjust the output of the nonlinear operator 215. The output operator 505 of the neuron multiplies that output y by an attenuation parameter that is specified for this output in the mask that the Dripout method uses to define one of the sample networks from the network 100. When the attenuation parameter for an input is less than 1, the influence of this output is reduced in the training of the sampled network.

Figure 5:
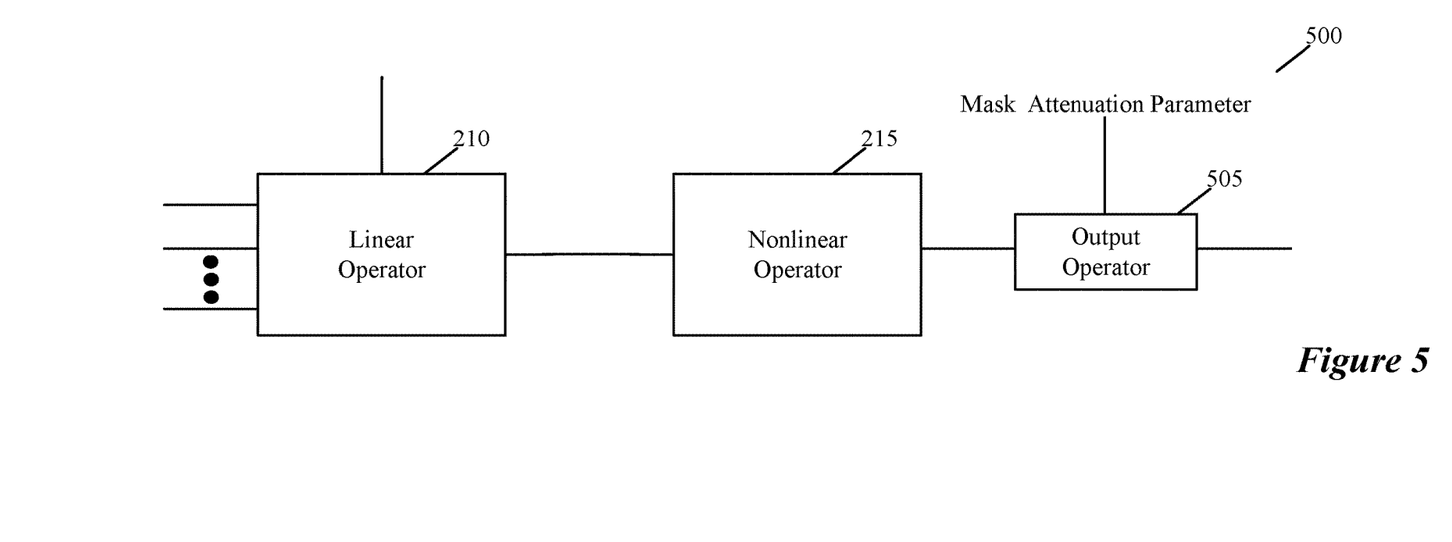

As the attenuation parameters are applied to the outputs of the interior neurons, and one neuron can receive the outputs of multiple prior interior neurons as its inputs, the rescaling of the weight coefficients in the output masking approach of FIG. 5 has two differences with the rescaling of the weight coefficients in the input masking approach of FIG. 4. First, the weight coefficients that are rescaled (by multiplying them with the multiplier $M_k$) are the unadjusted weight coefficients (i.e., are not first adjusted by multiplying them with the attenuation parameters). Second, for each node that has its weight coefficients rescaled, the Dripout method of some embodiments computes the multiplier $M_k$ by first (1) computing an effective adjusted weight coefficient for each of its inputs, and then (2) dividing 1 by the sum of these effective adjusted weight coefficients (in case the weight coefficients sum up to 1). To compute the effective adjusted weight coefficient for each particular node's input, the weight coefficient for this input is multiplied by the attenuation parameter that the mask defines for previous node's nonlinear operator 215 that produced the output value that was supplied on the particular node's input.

It should be noted that the mask attenuation parameters $r_k$ and the rescaling multipliers $M_k$ are used only during the training process. Because of the rescaling done during training, the resulting weight coefficients $w_k$ of the network 100 are correctly estimated for the original network (without mask attenuation or rescaling). The Dripout process produces a Rao-Blackwellized estimate of the original network's weights and is, thus, at least as efficient as Dropout and generally far more efficient. The resulting weight coefficients are then used during test time and run time as the coefficients of the linear operators of the network 100. Also, even though several examples that are described above train the weight coefficients of the linear operators of the network 100, one of ordinary skill will realize that the machine trained network of other embodiments has other configurable parameters that can be adjusted during the training of the network.

Figure 6:
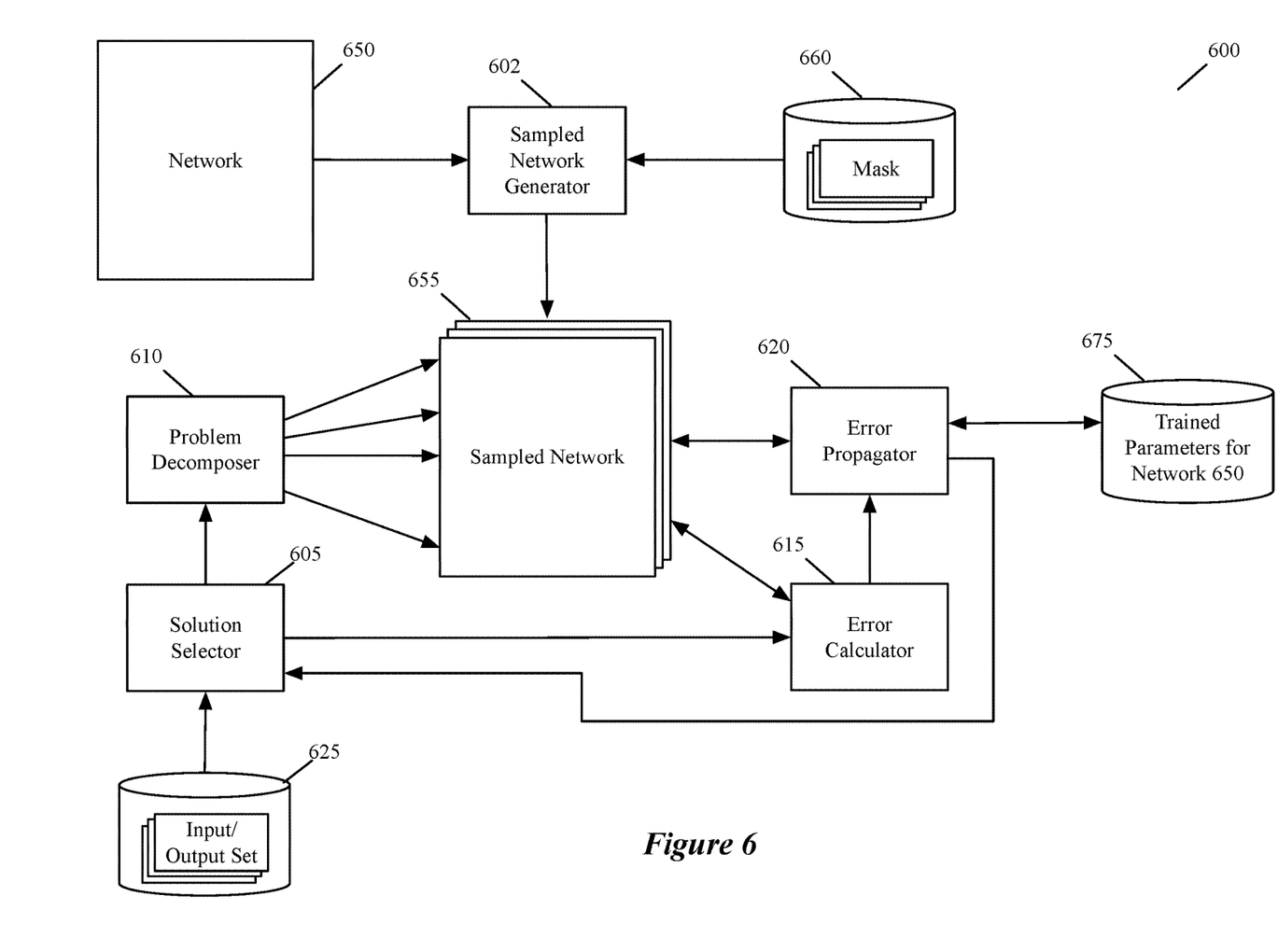
FIG. 6 illustrates a Dripout training system of embodiments that performs the Dripout training process to train the configurable parameters of a machine trained network.
Figure 7:
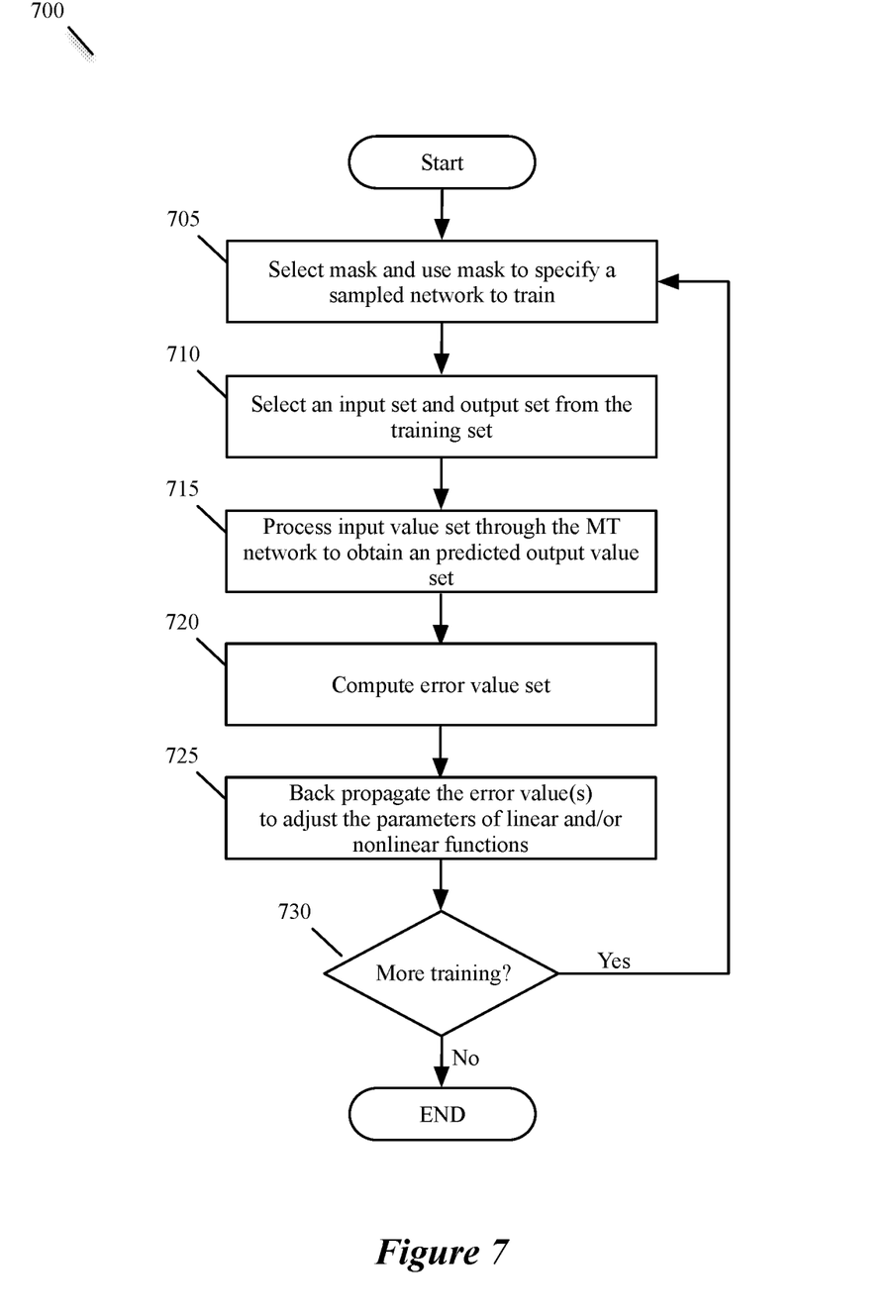
FIG. 7 illustrates the back-propagation process that the modules of FIG. 6 perform.

FIG. 6 illustrates a Dripout training system 600 of embodiments that performs the Dripout training process to train the configurable parameters of a machine trained network 650. This system uses several masks to define several sampled networks 655 for the MT network 650, uses multiple known training set solutions to train the sampled networks, and then uses the resulting, configurable parameters of the sampled networks as the configurable parameters of the MT network 650. As shown, the system 600 includes a sampled network generator 602, a solution selector 605, an input selector 610, an error calculator 615, and an error propagator 620. In some embodiments, all of these modules execute on one device, such as server, a desktop, a laptop, a mobile device (e.g., smartphone, tablet, etc.) or an IoT device. FIG. 7 illustrates the back-propagation process 700 that the modules of FIG. 6 perform.

As shown in FIG. 7, the sampled network generator 602 initially selects (at 705) an interior node, influence-attenuating mask from a mask storage 660 and uses this mask to generate from the network 650 a sampled network 655 to train. The interior-node, influence-attenuating mask specifies attenuation parameters that are applied (1) to the outputs of the interior nodes of the network in some embodiments, (2) to the inputs of the interior nodes of the network in other embodiments, or (3) to the outputs and inputs of the interior nodes in still other embodiments.

Next, at 710, the solution selector 605 initially selects a known solution set from the training set of solutions that are stored in a data storage 625. In some embodiments, the data storage 625 is on the same device that executes the training system 600 of FIG. 6, while in other embodiments, this data storage is on a remote server. The selected solution set includes a set of input values and a set of output values. The output value set is the set of output values that the MT network 650 should generate for the input value set of the selected solution set. In other words, the output value set is the known/desired output value set for the input value set. For example, in some embodiments, the MT network 650 determines whether video frames include faces. For these embodiments, each input/output set in the training set includes (1) a pixel value set of a video frame as the input value set, and (2) a Boolean output value that indicates whether the video frame has a face.

At 715, the input selector 610 selects the inputs to the MT network's input nodes from the set of input values selected at 710. For the above-described face recognition problem, the input selector 610 in some embodiments supplies different sets of pixel values from the video frame as inputs to different input nodes of the MT network 650. Next, at 720, the specified sampled network (i.e., the sampled network specified at 705) forward propagates the supplied input values to produce a set of output values. In some embodiments, this processing entails each processing node of the sampled network first having its linear operator 210 compute a weighted sum of its input, and then having its nonlinear activation operator 215 compute a function based on the output of the linear component.

Forwarding propagating the selected input set through the specified sampled network entails forward propagating the selected input set through the network 650 with the attenuation parameters of the selected mask (i.e., the mask selected at 705) applied to (1) the outputs of the interior nodes of the network in some embodiments, (2) the inputs of the interior nodes of the network in other embodiments, or (3) the outputs and inputs of the interior nodes in still other embodiments.

At 720, the error calculator 615 computes a set of error values from (1) the output value set computed by the specified sampled network for the supplied input value set, and (2) the output value set from the selected training input/output solution (selected at 705). As shown, the error calculator 615 receives the training set's output value(s) from the solution selector 605 in some embodiments. In some embodiments, each error value in the error value set is computed by taking the difference between one output value in the selected output value set and its corresponding output value in the computed output value set.

As mentioned above, the MT network of some embodiments has one output processing node that produces just one output value, while the MT network of other embodiments has multiple values in its output value set as it has multiple output nodes in its output stage. For the above-mentioned facial recognition example, the MT network of some embodiments produces one output value in a range (e.g., 0 to 1) with numbers above one particular value in the range representing 1 or True and numbers below the particular value representing 0 or False.

At 725, the error calculator 615 provides the error value set that it computes to the error propagator 620, which then coordinates the back propagation of this error value set through the processing nodes of the MT network. In some embodiments, each processing node is an instantiated object that includes a back-propagation function for handling back-propagation calls from the error propagator 620. In these embodiments, each time the error propagator 620 calls a processing node's back-propagation function, this function computes adjustments to the weight coefficients of the node's linear operator and returns to the error propagator 620 these adjustments along with error values to propagate back to each of nodes that supplied the inputs of the node's linear operator. The error propagator stores the adjusted weight coefficients in the trained parameter data storage 675.

Whenever the error propagator calls a propagating function of a particular processing node that is not an output processing node, the error propagator 620 in some embodiments aggregates (e.g., sums) the error values that it has receives from later processing nodes when more than one processing node receives the particular processing node's output, and then supplies the aggregated error value to the particular processing node's propagating function. The back-propagation operation will be further described below by reference to FIG. 8.

After the computed error value is back propagated through the processing nodes of the specified sampled network and one or more of these nodes adjust their linear operator coefficients during this back propagation, the error propagator 620 notifies the solution selector 605 that it has completed its error propagation. Next, at 730, the solution selector 605 determines whether it should stop the training of the network. In some embodiments, the solution selector 605 uses a minimization process (e.g., a stochastic gradient descent minimizer) to determine when it should stop the training of the network. When the solution selector 605 determines that it should continue the training, the process 700 directs (at 705) the sampled network generator 602 to select another mask from the storage 660, and to use this mask to specify another sampled network. The operations 710-730 are then repeated for this specified sampled network. In performing this iteration of the operations 710-730, the process 700 adjusts the weight coefficients that are stored in parameter storage 675 and that were adjusted in the previous iterations of these operations by the process 700. When the process 700 determines (at 730) that it has sufficiently trained the network, the process ends. The weight coefficients that the parameter storage 675 stores when the process 700 ends, are the trained weight coefficients of the network 650.

Figure 8:
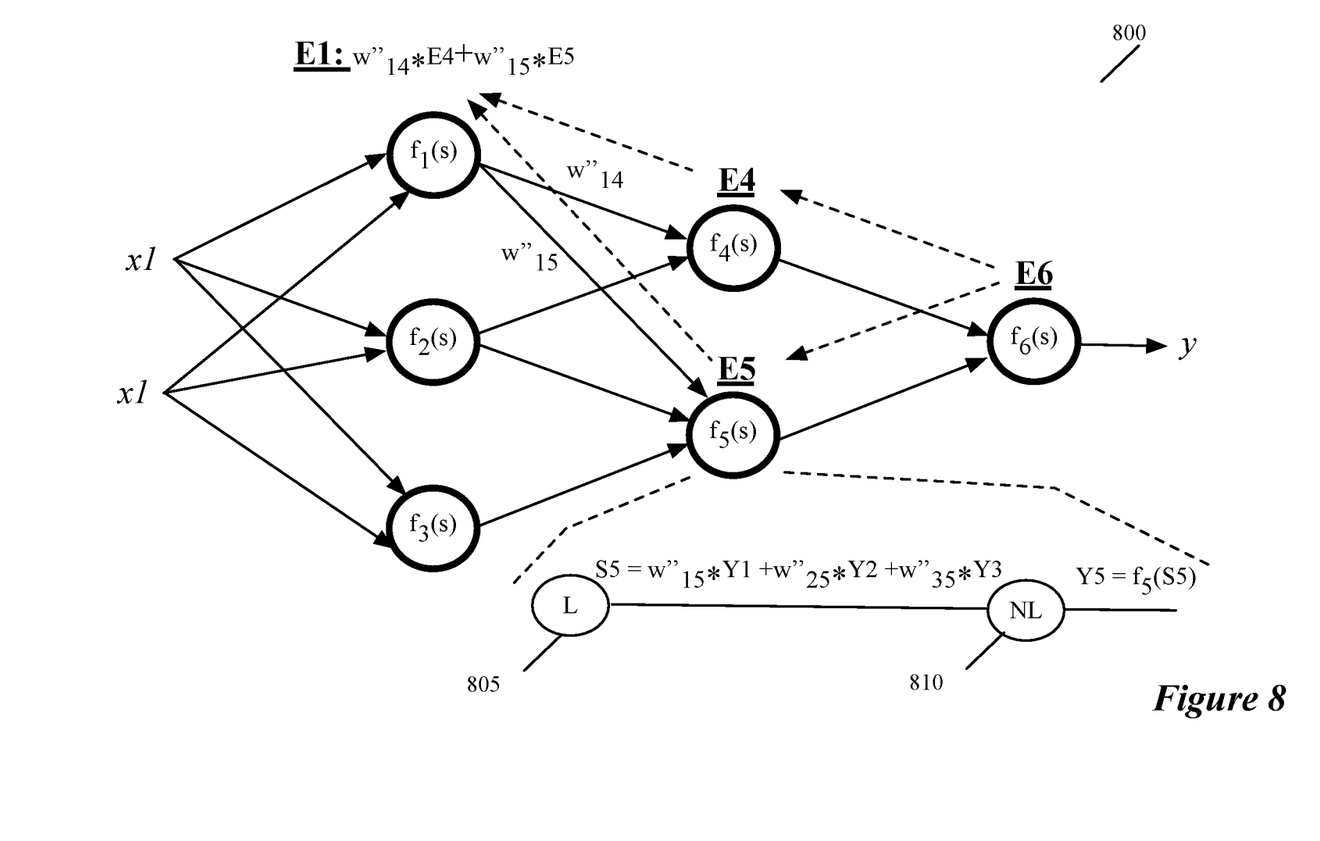
FIG. 8 illustrates an example of a simple sampled network in order to explain how the Dripout method of some embodiments performs back propagation.

FIG. 8 illustrates an example of a simple MT sampled network 800 in order to explain how the Dripout method of some embodiments performs back propagation. In this example, the sampled network has six processing nodes. Also, in this example, it is assumed that the mask that specifies the sampled network 800, provides attenuation parameters that are to be applied to the inputs of the interior nodes.

As shown by the fifth node in FIG. 8, each processing node has a linear operator 805 that computes a sum S of the dot products of the node's linear operator inputs and the node's second adjusted weights coefficient set, as defined by Equation (D) above. Each processing node also has a nonlinear operator 810 that computes an activation function Y based on the sum S that the linear operator outputs. In the example illustrated in FIG. 8, each weight coefficient $w_{xy}$ of an interior or output node has a two-number subscript, with the first number identifying the processing node that supplies the input associated with the coefficient and the second number identifying the processing node that receives this input. Also, in this example, the output of the nonlinear operator of each processing node is the output of the processing node.

This example illustrates that the output error E6 (which is the error in the output node 6) is used to derive the errors E4 and E5 in the output of the fourth and fifth nodes during a back propagation operation. It also illustrates that the error E1 in the output of node 1 is derived as a weighted sum of the errors in the outputs of fourth and fifth nodes to which the output of node 1 is supplied. As shown for the output error of node 1, the weights' coefficients w$_{xy}$" used to propagate errors back are equal to the weight coefficients used during the computation of the node output values. Only the direction of data flow is changed, where error values are propagated from output to inputs one after the other. This technique is used for all network layers.

After the error value for each processing node is computed, the weights coefficients of each node's input can be modified. For example, in some embodiments, the back propagation function for node 4 adjusts the weight coefficient w$_{14}$ (which the linear operator of node 4 dot products with the input from node 1) as follows:

$$w^N_{14} = w^O_{14} + h(E4)(df_4(S)/dS)Y1,$$

where w$^N_{14}$ is the new weight value for weight coefficient w$_{14}$ (the weight value after the adjustment based on the back propagated error E4), w$^O_{14}$ is the old weight value for weight coefficient w$_{14}$ (the weight value before the adjustment based on the back propagated error E4), h is a training coefficient, df$_4$(S)/dS represents partial derivative of activation function of node 4, and Y1 is the output of node 1. The parameter h affects network teaching speed. The derivative of the activation function is often expressed as a function itself. The derivatives of sigmoid, tanh, ReLU, or leaky ReLU activation functions are known, and are described in common neural network literature, including those referred to above.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
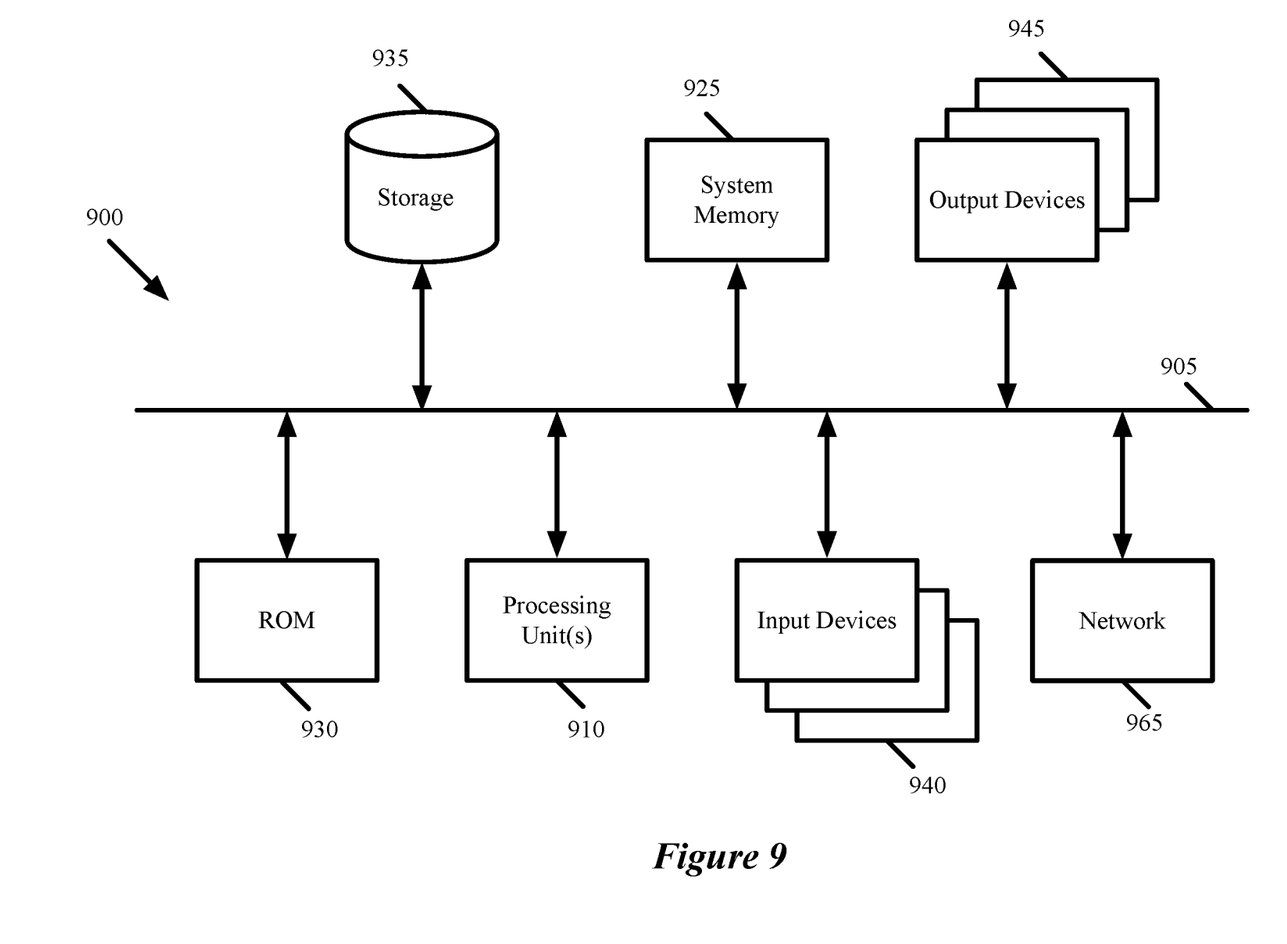
FIG. 9 conceptually illustrates a computer system with which some embodiments of the invention are implemented.

FIG. 9 conceptually illustrates a computer system 900 with which some embodiments of the invention are implemented. As such, it can be used to execute any of the above described processes. This computer system includes various types of non-transitory machine readable media and interfaces for various other types of machine readable media. Computer system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments. The read-only-memory (ROM) 930 stores static data and instructions that are needed by the processing unit(s) 910 and other modules of the computer system. The permanent storage device 935, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the computer system. The input devices 940 include alphanumeric keyboards and pointing devices (also called "cursor control devices"). The output devices 945 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples computer system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of configuring a machine trained (MT) network comprising input and output nodes, and interior nodes between the input and output nodes, each node producing an output, and each interior or output node receiving as inputs a set of outputs of a set of other nodes, each node having a set of configurable parameters for training, the method comprising:
    iteratively selecting a plurality of influence-attenuating masks, each mask specifying a different plurality of attenuation parameters for applying to the inputs of each of the interior nodes, said attenuation parameters for each of a set of one or more masks including at least three different values; and
    for each mask:
        selecting an input set of values with a known output set of values;
        using the mask to forward propagate the input set of values through the network's nodes to produce a computed output set of values; and
        using the mask to back propagate a set of error values that quantifies a difference between the input set's known output set and the input set's computed output set, said back propagation assigning error values from later nodes to earlier nodes and adjusting the configurable parameters of the nodes based on (i) the assigned error values and (ii) the plurality of attenuation parameters.

2. The method of claim 1, wherein the attenuation parameters for each of the masks fall within a range of values between 0 and 1, and excluding 0 but including 1.

3. The method of claim 1, wherein the attenuation parameters for each of the masks fall within a range of values between 0 and 1.

4. The method of claim 1, wherein each of a plurality of nodes comprises:
    a linear component that uses a set of weight coefficients to combine a set of output values of a set of nodes to compute a first calculated value; and
    a nonlinear component to compute a second calculated value from the node's first calculated value,
    wherein the configurable parameters of the network comprise at least the set of weight coefficients of the set of nodes.

5. The method of claim 4, wherein using the mask to forward propagate comprises multiplying each weight coefficient associated with a node's input by an attenuation parameter specified for that input in the selected mask.

6. The method of claim 1, wherein using the mask to forward propagate comprises multiplying each node's input by the attenuation parameter specified for node in the selected mask.

7. The method of claim 6, wherein in a mask, an attenuation parameter of 1 for a node leaves the node's input unaffected, while an attenuation parameter less than 1 for a node reduces the node's input and thereby diminishes the influence of the node's input during the training of the network for that mask.

8. The method of claim 1, wherein back propagating the error values for the masks selected in different iterations averages the configurable parameters that are produced for the plurality of the selected masks to obtain the configurable parameters of the MT network.

9. A non-transitory machine readable medium storing a program for configuring a machine trained (MT) network comprising input and output nodes, and interior nodes between the input and output nodes, each node producing an output, and each interior or output node receiving as inputs a set of outputs of a set of other nodes, each node having a set of configurable parameters for training, the program comprising sets of instructions for:
    iteratively selecting a plurality of influence-attenuating masks, each mask specifying a different plurality of attenuation parameters for applying to the inputs of each of the interior nodes, said attenuation parameters for each of a set of one or more masks including at least three different values; and
    for each mask:
        selecting an input set of values with known output set of values;
        using the mask to forward propagate the input set of values through the network's nodes to produce a computed output set of values; and
        using the mask to back propagate a set of error values that quantifies a difference between the input set's known output set and the input set's computed output set, said back propagation assigning error values from later nodes to earlier nodes and adjusting the configurable parameters of the nodes based on (i) the assigned error values and (ii) the plurality of attenuation parameters.

10. The non-transitory machine readable medium of claim 9, wherein the attenuation parameters for each of the masks fall within a range of values between 0 and 1, and excluding 0.

11. The non-transitory machine readable medium of claim 9, wherein each of a plurality of nodes comprises:
- a linear component that uses a set of weight coefficients to combine a set of output values of a set of nodes to compute a first calculated value; and
- a nonlinear component to compute a second calculated value from the node's first calculated value,
- wherein the configurable parameters of the network comprise at least the set of weight coefficients of the set of nodes.

12. The non-transitory machine readable medium of claim 11, wherein the set of instructions for using the mask to forward propagate comprises a set of instructions for multiplying each weight coefficient associated with a node's input by an attenuation parameter specified for that input in the selected mask.

13. The non-transitory machine readable medium of claim 9, wherein the set of instructions for using the mask to forward propagate comprises a set of instructions for multiplying each node's input by the attenuation parameter specified for node in the selected mask.

14. The non-transitory machine readable medium of claim 13, wherein in a mask, an attenuation parameter of 1 for a node leaves the node's input unaffected, while an attenuation parameter less than 1 for a node reduces the node's input and thereby diminishes the influence of the node's input during the training of the network for that mask.

15. A method of configuring a machine trained (MT) network comprising input and output nodes, and interior nodes between the input and output nodes, each node producing an output, and each interior or output node receiving a set of outputs of a set of other nodes, each node having a set of configurable parameters for training, the method comprising:
- iteratively selecting a plurality of influence-attenuating masks, each mask specifying a different plurality of attenuation parameters for applying to the outputs of each of the interior nodes, said attenuation parameters for each of a set of one or more masks including at least three different values; and
- for each mask:
  - selecting an input set of values with known output set of values;
  - using the mask to forward propagate the input set of values through the network's nodes to produce a computed output set of values; and
  - using the mask to back propagate a set of error values that quantifies a difference between the input set's known output set and the input set's computed output set, said back propagation assigning error values from later nodes to earlier nodes and adjusting the configurable parameters of the nodes based on (i) the assigned error values and (ii) the plurality of attenuation parameters.

16. The method of claim 15, wherein the attenuation parameters for each of the set of masks fall within a range of values between 0 and 1, and excluding 0 but including 1.

17. The method of claim 15, wherein the attenuation parameters for each of the set of masks fall within a range of values between 0 and 1.

18. The method of claim 15, wherein each of a plurality of nodes comprises:
- a linear component that uses a set of weight coefficients to combine a set of output values of a set of nodes to compute a first calculated value; and
- a nonlinear component to compute a second calculated value from the node's first calculated value,
- wherein the set of configurable parameters of the network comprise at least the set of weight coefficients of the set of nodes.

19. The method of claim 15, wherein using the mask to forward propagate comprises multiplying each node's output by the attenuation parameter specified for node in the selected mask.

20. The method of claim 19, wherein in a mask, an attenuation parameter of 1 for a node leaves the node's second calculated value unaffected as the node's output value, while an attenuation parameter less than 1 for a node reduces the node's second calculated value and thereby diminishes the node's influence during the training of the network for that mask.

21. The method of claim 15, wherein back propagating the error values for the masks selected in different iterations averages the configurable parameters that are produced for the plurality of the selected masks to obtain the configurable parameters of the MT network.

* * * * *